Feb. 3, 1925.
A. L. MAYER
1,524,797
LANTERN SLIDE
Filed April 7, 1923
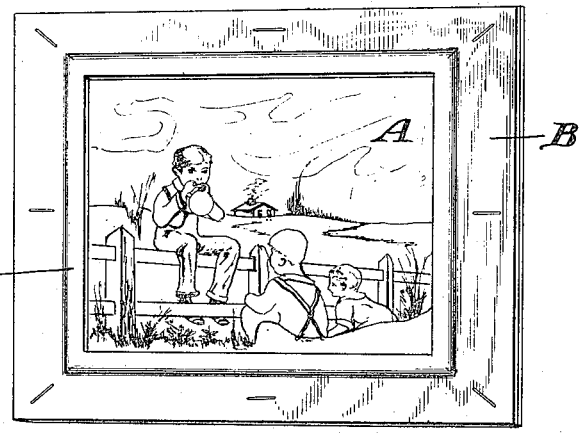
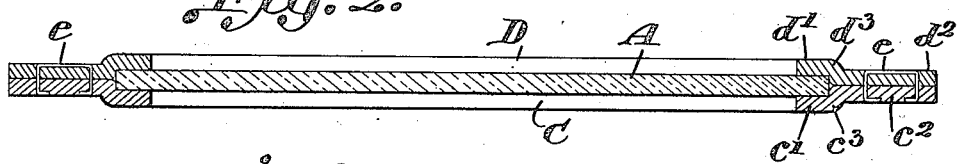
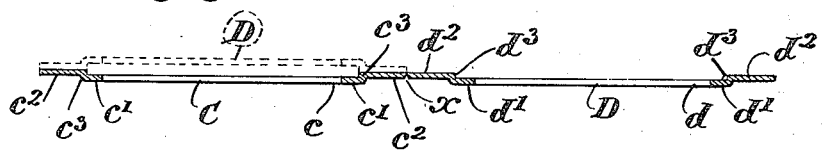
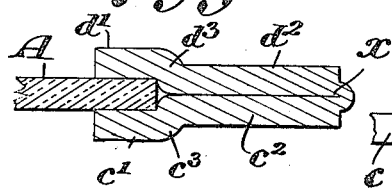
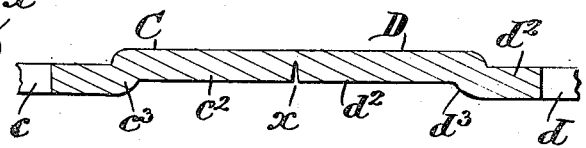
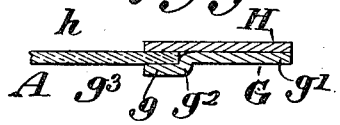
Inventor
Alvin L. Mayer
by his Attorneys
Baldwin & Wight Patented Feb. 3, 1925.

1,524,797

UNITED STATES PATENT OFFICE.

ALVIN L. MAYER, OF LONG ISLAND CITY, NEW YORK.

LANTERN SLIDE.

Application filed April 7, 1923. Serial No. 630,567.

*To all whom it may concern:*

Be it known that I, ALVIN L. MAYER, a citizen of the United States, residing at Long Island City, in the county of Queens and State of New York, have invented certain new and useful Improvements in Lantern Slides, of which the following is a specification.

This invention relates to slides for projecting machines, such as magic-lanterns, stereoscopes, motion picture machines, and the like, in which pictures, advertisements, announcements, etc. are printed or otherwise formed on plates of glass or other suitable transparent material of proper size for use in the machines. Such slides are now very largely used in motion picture machines and commonly the glass plates are assembled for the purpose of handling them while in use or during packing or transportation.

My invention involves frames for the plates which may be quickly made at small cost, may be easily applied to the plates, and when so applied will thoroughly protest them from breakage or injury.

In carrying out my invention in one of the preferred ways I form the frames of paper or pulp board having portions providing seats for the glass and other portions which surround the glass and receive fastening devices which securely hold the frame members in place around the glass.

In one form of the invention a blank is formed having two similar members connected together by a scored part of the blank, each member having a depression or seat for the glass and a marginal portion shaped to surround the glass and to receive fastening devices. The blank is folded about its scored portion so that one member may be turned over upon the other with similar part of the two members in register. Before folding the blank, the glass is placed in the seat of one of the members and when the other member is folded over upon the first mentioned member the glass is completely surrounded by the frame. The two frame members are formed with openings preferably of the same size so that a clear projection field is provided through both members. These members may be fastened together in any suitable way.

Other forms of the invention are illustrated in the accompanying drawings and will be hereinafter described.

Figure 1 is a front elevation of a lantern slide embodying my improvements.

Figure 2 is a sectional view showing how the glass plate is held in one form of frame made in accordance with my invention.

Figure 3 illustrates a blank comprising two frame members made from a single piece of material and scored in such manner that one member may be folded over upon the other to enclose the glass.

Figures 4 and 5 illustrate on an enlarged scale that portion of the blank which is scored and folded.

Figure 6 shows a modification in which one member of the frame is formed with a seat for the glass while the other member is flat and has no glass seat or depression.

Figure 7 shows a construction in which one frame member is formed with a glass plate seat while the other is not recessed to receive a glass but has its outer portion bent around the outer edge of the first mentioned member.

Figure 8 shows another modification in which one member of the frame is provided with a seat deep enough to receive the glass plate, while the other member, which is made integrally with the first mentioned member, is straight and flat but is adapted to be folded over upon the first mentioned member.

In Figure 1 I have shown a lantern slide comprising a transparent plate A and a frame B. It will be observed that a bead $a$ is formed on the frame around the projection opening which not only adds to the appearance of the slide but strengthens the frame and holds the marginal portions of the frames apart when the slides are packed. The frame is made of some relatively soft pliable material such as paper board or pulp board instead of being bent or indented to give it the proper form.

Figure 3 shows in section a blank for the frame before it is bent or folded. In this case there are two members C and D of precisely the same size and shape. The member C has a projection opening $c$ and the member D has a similar opening $d$ of precisely the same size as $c$. Surrounding the opening $c$ is a narrow ledge $c'$ which is joined to a marginal part $c^2$ by a bent part $c^3$. In this way a seat for the glass plate is formed, the seat in this case in the member C being adapted to receive the inner portion only of the plate. The other member D has similar parts lettered $d'$, $d^2$, and $d^3$. The adjacent marginal parts of the frame blank are scored at $x$ so that one member may be folded over upon the other as indicated in dotted lines in Figure 3. When thus folded, the corresponding parts register, leaving the openings $c$, $d$ clear and a plate may be held in the seats $c'$, $d'$ in the manner indicated. The marginal edges may be secured by cement, staples, or by other fastening devices. Form may be given to the two members by dies or in other suitable ways.

Figures 4 and 5 illustrate on an enlarged scale parts of the frame members and Figure 4 indicates how the glass plate is held therein.

In Figure 2 a frame construction is shown in which the members C and D are separately formed instead of being joined at $x$ (Figure 3). Otherwise the construction is the same and the parts are similarly lettered. The marginal parts $c^2$, $d^2$ may be secured together by cement, by staples $e$, or by other suitable devices.

In Figure 6 a further modification is illustrated. In this case one of the frame members G is formed with a seat $g$ for the plate and with a marginal portion $g'$ held away from the seat $g$ by a bent part $g^2$ which is of such size as to give the required depth to the seat to receive the plate. The member H is a rectangular frame piece having an opening $h$ of the same size as the opening $g^3$ in the member G. The two frame members may be fastened in any suitable way.

Figure 7 shows a frame construction in which the member K is formed with a plate seat $k$ and the member L is formed with an outer portion $l$ which is bent around the outer edge of the member K and may be cemented or otherwise attached thereto. It will be understood that the construction of the frame members on all four sides is substantially the same in all cases.

In Figure 8 a further modification is indicated. The member M is similar to the member C in Figure 3, while the member N has no seat for the plate but is joined to the member M at $m$. Both members may be formed from a single piece of material and the member N may be bent over upon the member M in such manner as to enclose the plate A and to leave a clear projection opening through the slide.

Lantern slides as usually constructed contain two glass plates, one bearing the picture or other object to be projected and the other employed to protect the picture plate. Each of these plates is of standard lantern slide size and the two plates are commonly bound together by passepartout or similar material. Slides made in this way are expensive, a large amount of glass in each slide is used, and the slides are heavy to handle and make transportation charges large. By my improvements a single piece of glass is used, thus affording a considerable saving in the material and this expense is still further decreased by reason of the fact that the glass is of materially less area than the slide as a whole. The single glass plate is thoroughly protected from breakage or injury in handling, packing and transportation and is adapted for use in standard machines.

I claim as my invention:

1. A lantern slide comprising a transparent plate and a frame therefor consisting of two members of standard lantern slide size from edge to edge and which are bent to form offset seats or ledges for the edge portions of the plate and surround projection openings in both members, each of said frame members having a marginal portion projecting beyond the edges of the plate and both of said marginal portions being brought close together beyond the edges of the plate and securely fastened.

2. A lantern slide frame consisting of a single piece of material comprising two members foldable the one upon the other and each having a projection opening surrounded by an offset ledge providing a plate seat and a marginal portion surrounding the ledge in combination with a transparent plate resting on the ledge.

3. A lantern slide comprising a transparent plate and a frame therefor consisting of two members, each having a projection opening through it, one of which members is formed with an offset seat for the plate and a marginal portion and the other member being formed with a part which overlaps the seated part of the plate, lies in contact with the marginal portion of the other member and is fastened thereto.

In testimony whereof, I have hereunto subscribed my name.

ALVIN L. MAYER.